Patented Dec. 23, 1924.

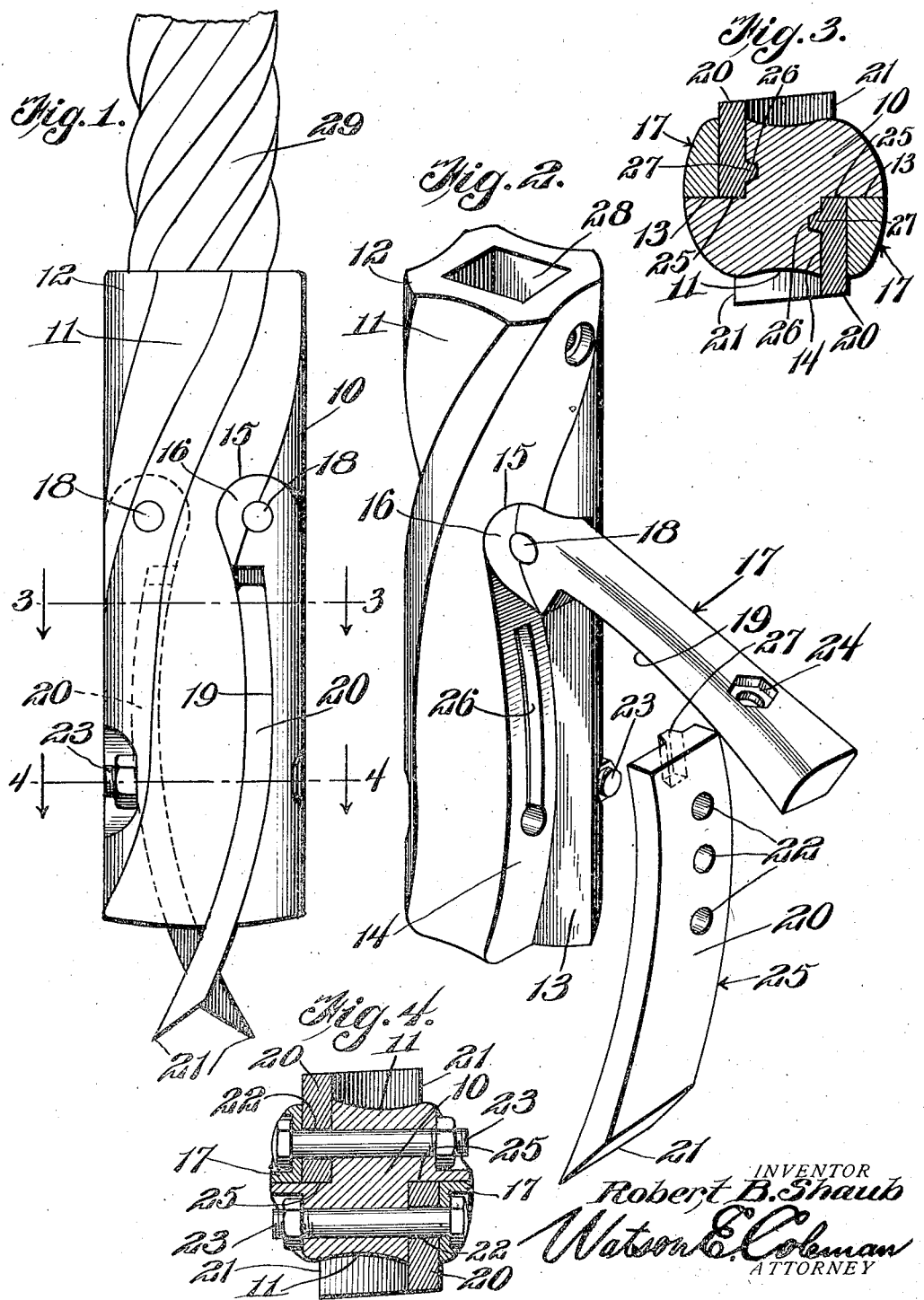

1,520,147

UNITED STATES PATENT OFFICE.

ROBERT B. SHAUB, OF CANTON, ILLINOIS.

DRILL.

Application filed May 13, 1924. Serial No. 713,046.

*To all whom it may concern:*

Be it known that I, ROBERT B. SHAUB, a citizen of the United States, residing at Canton, in the county of Fulton and State of Illinois, have invented certain new and useful Improvements in Drills, of which the following is a specification, reference being had to the accompanying drawings.

This invention relates to improvements in drills and more particularly to an improvement in the construction of coal drills.

An important object of the invention is to provide a device of this character from which the drill bits proper are readily removable for sharpening and at the same time are so supported that they do not become clogged or packed with coal so that cleaning is necessary at each handling of the drill and removing and replacing the bits.

A further object of the invention is to provide a device of this character in which the bit is very steadily held and may be extended from time to time to increase the length thereof, thereby permitting sharpening of the bits many times and an increase in the life thereof.

A still further object of the invention is to provide a drill head having clamping jaws for maintaining the bits in position, which clamping jaws are pivotally secured to the drill head so that in replacing or removing the drills the clamp is swung to the open position and any dirt or coal dust which may have collected therein will fall or may be readily removed therefrom.

These and other objects I attain by the construction shown in the accompanying drawings, wherein for the purpose of illustration is shown a preferred embodiment of my invention and wherein:

Figure 1 is a side elevation of a drill constructed in accordance with my ;nvention;

Figure 2 is a perspective view thereof, one of the clamping jaws being shown in the open position and the blade being shown as removed;

Figure 3 is a section on the line 3—3 of Figure 1;

Figure 4 is a section on the line 4—4 thereof.

Referring now more particularly to the drawings, the drill head comprises a solid body 10 circular in cross section and having formed in the outer surface thereof spiral grooves 11 producing upon the periphery of the body spiral ribs 12. At opposite sides of the body at one end thereof the body is provided with rabbets 13 each having the bottom wall thereof arcuately curved as indicated at 14. The end of the rabbet is in the form of a circular cove 15 in which is mounted the circular end of the shank 16 of a clamping bar 17. This clamping bar is pivoted to the body by a rivet 18 extending through the bar and body and has its under surface notched out, as at 19, from a point adjacent the pivoted end thereof to the free end thereof, this notch being of a depth approximating the thickness of the blades 20 which are to be employed.

The blades 20 are each constructed from a flat strip of metal preferably, but not necessarily, slightly tapered throughout its length as to width and having one end thereof sharpened to provide a cutting edge 21. Adjacent its opposite end the blade is provided with a plurality of longitudinally spaced openings 22 adapted for the reception of a securing element 23 which is in the form of a bolt extending through the body and clamp 17 adjacent the ends thereof and having the head and nut seated in sockets 24 formed in these members. It will be seen that by shifting the blade the length of exposed end may be regulated and the blade will be very firmly held in position in the body, the blade having one straight edge 25 which rests against the straight wall of the rabbet for guidance and is held firmly against this wall when the bolt is in position. As a further means of assisting in maintaining the blade against movement, I preferably provide the curved walls of the rabbets with longitudinally extending grooves 26 into which extend lugs 27 formed upon the upper end of the coacting faces of the blades 20. The upper end of the body 10 is preferably socketed, as at 28, for the reception of the shank of the twisted drill bar 29.

It will be obvious that a drill constructed in accordance with the foregoing may be readily provided with new blades when the blades in use become dulled and these blades on account of their length may be readily held while sharpening and may be sharpened many times thus extending the life thereof. The body 10 of the drill head may be constructed from cheaper metal than the drills, for example, malleable steel, this reducing the cost of production thereof.

It will furthermore be obvious that the construction hereinbefore set forth is capable of a certain range of change and modification without materially departing from the spirit of my invention and I accordingly do not limit myself to such specific structure except as hereinafter claimed.

I claim :—

1. In a drill of the type described, a drill head comprising a body having in its side faces at opposite sides thereof longitudinally extending rabbets, these rabbets each having one straight wall and one wall which is arcuately curved, the upper end of the rabbet being in the form of a cove in which is pivotally mounted a swinging clamping bar, and bits each formed from a flat strip having one straight wall coacting with the straight wall of the rabbet, the bit being curved to conform to the curvature of the other wall of the rabbet, securing elements extending through said clamping bars and body having aligned openings for the reception of securing elements, the bits having a series of longitudinally spaced openings through which said securing elements may pass.

2. In a drill of the type described, a drill head comprising a body having in its side faces at opposite sides thereof longitudinally extending rabbets, these rabbets each having one straight wall and one wall which is arcuately curved, the upper end of the rabbet being in the form of a cove in which is pivotally mounted a swinging clamping bar, and bits each formed from a flat strip having one straight wall coacting with the straight wall of the rabbet, the bit being curved to conform to the curvature of the other wall of the rabbet, securing elements extending through said clamping bars and body having aligned openings for the reception of securing elements, the bits having a series of longitudinally spaced openings through which said securing elements may pass, the curved wall of the rabbet having a longitudinally extending groove, the coacting wall of the blade having a lug engaging in said groove.

3. In a drill of the type described, a drill head comprising a body having in its side faces at opposite sides thereof longitudinally extending rabbets, these rabbets each having one straight wall and one wall which is arcuately curved, the upper end of the rabbet being in the form of a cove in which is pivotally mounted a swinging clamping bar, and bits each formed from a flat strip having one straight wall coacting with the straight wall of the rabbet, the bit being curved to conform to the curvature of the other wall of the rabbet, securing elements extending through said clamping bars and body having aligned openings for the reception of securing elements, the bits having a series of longitudinally spaced openings through which said securing elements may pass, the outer face of the body being spirally grooved, the opposite end of the body having formed therein a socket for the reception of the drilling bar.

In testimony whereof I hereunto affix my signature.

ROBERT B. SHAUB.